Feb. 16, 1954          C. K. SMITH          2,669,436
APPARATUS FOR PREPARING AND APPLYING PLASTIC COATING MATERIAL
Filed May 25, 1951          5 Sheets-Sheet 4

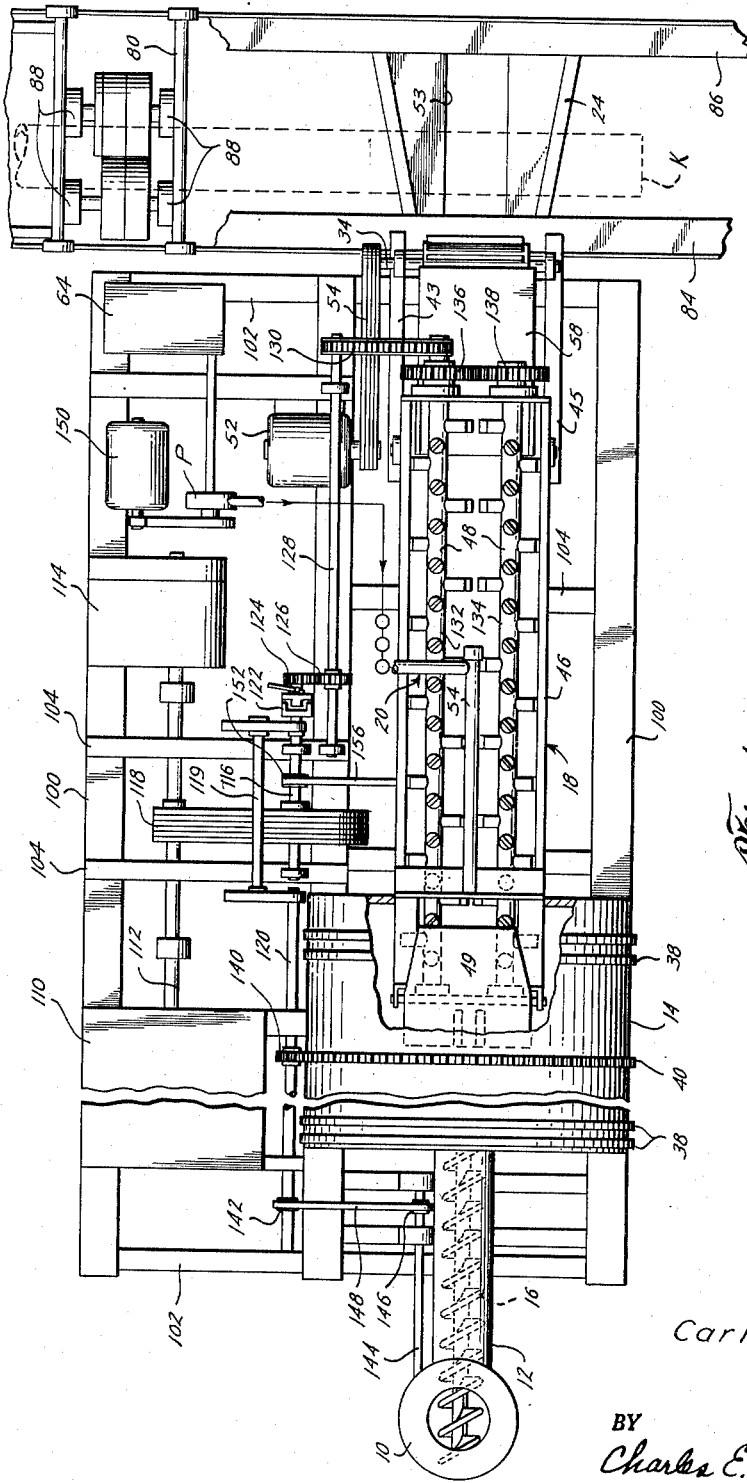

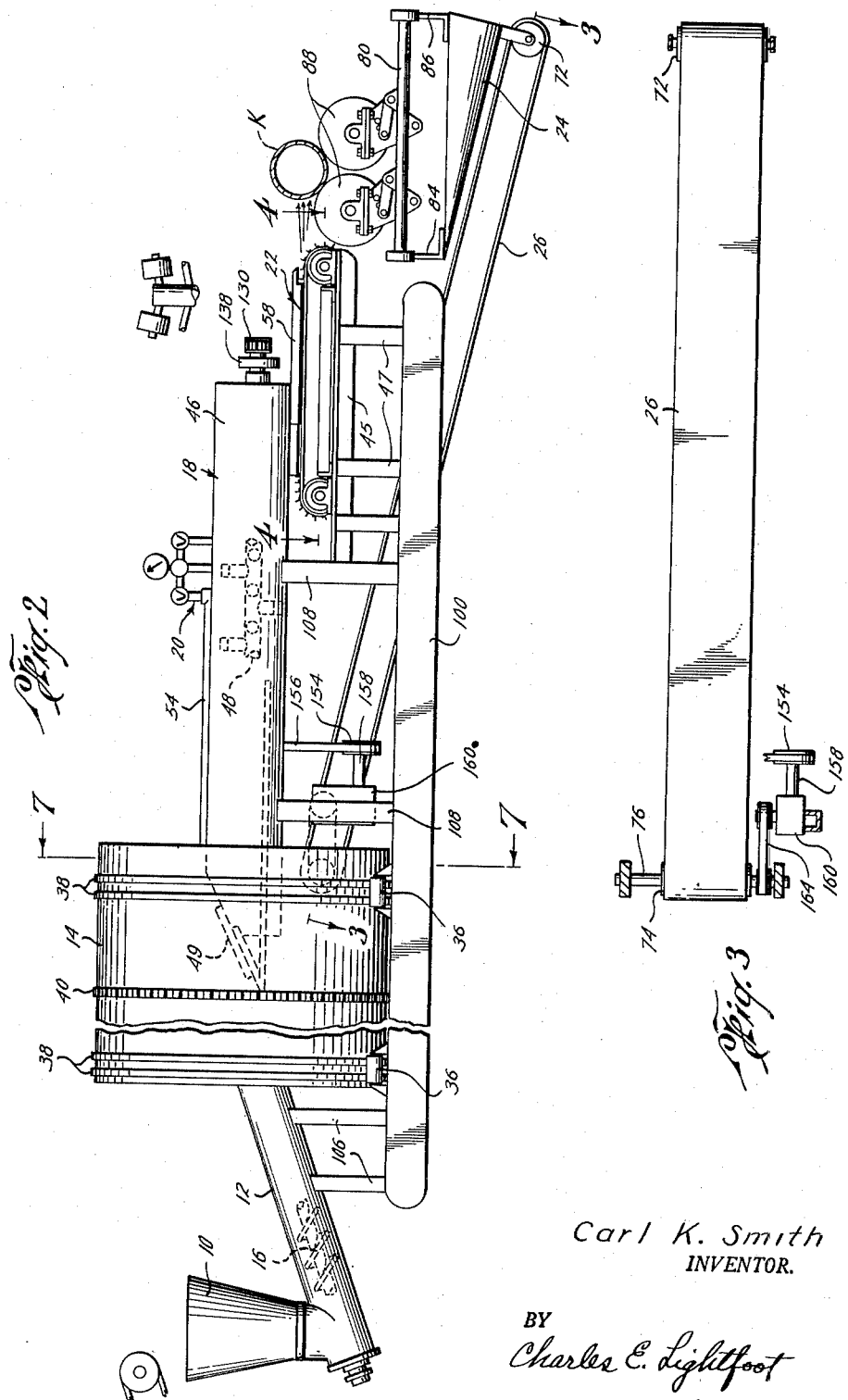

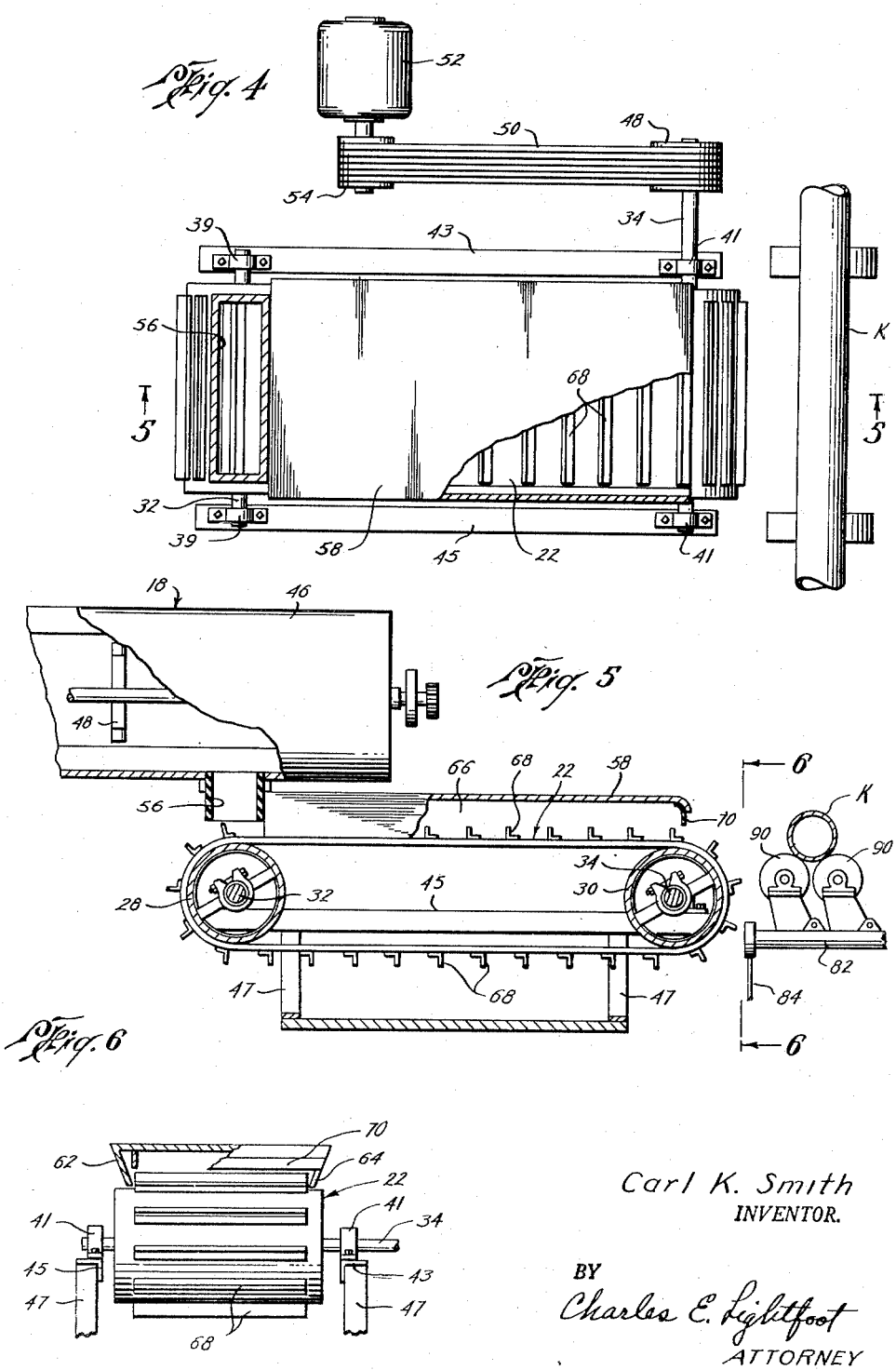

Carl K. Smith
INVENTOR.

BY
Charles E. Lightfoot
ATTORNEY

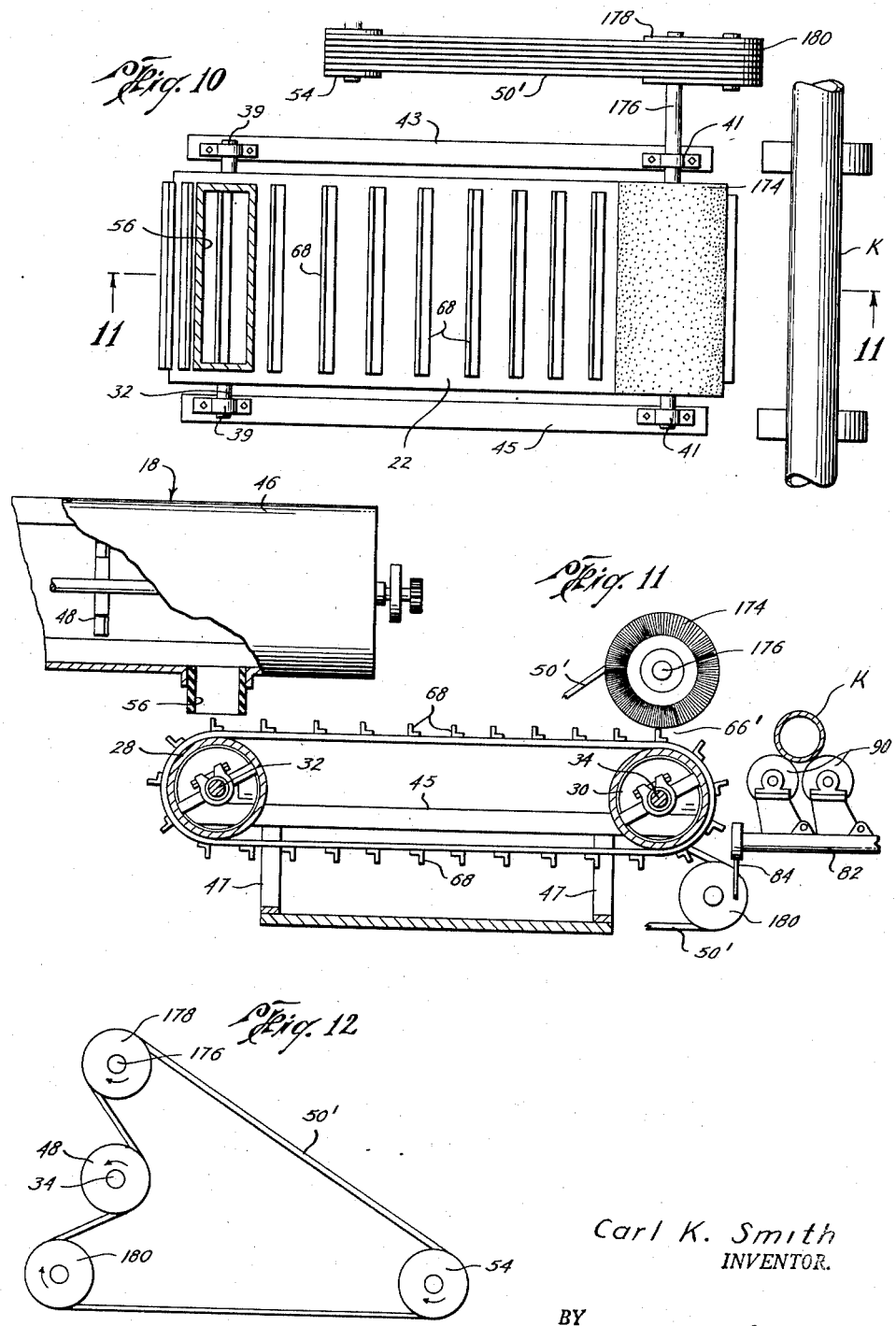

Patented Feb. 16, 1954

2,669,436

UNITED STATES PATENT OFFICE 2,669,436

APPARATUS FOR PREPARING AND APPLYING PLASTIC COATING MATERIAL

Carl K. Smith, Corpus Christi, Tex.

Application May 25, 1951, Serial No. 228,289

2 Claims. (Cl. 259—2)

This invention relates to apparatus for preparing and applying plastic coating material, and more particularly to a machine for forming protective and weight increasing coatings such as concrete and applying such coatings to pipes or the like.

The invention finds particular application in the preparation of pipe for use in the construction of pipe lines wherein portions of the pipe are weighted for the purpose of overcoming the buoying effect of water, or soil whose water content is sufficiently high to cause floating of the pipe.

While the invention is particularly useful in the coating of pipes with protective or weight increasing coatings, it is not limited to such use, but is capable of broad application wherever a coating, such as concrete or other plastic material is to be applied to a support, such, for example, as the coating of suitable forms in the manufacture of concrete pipe.

An important object of the invention is the provision of apparatus for continuously mixing and feeding plastic coating material to impeller mechanism by which such material may be propelled at high velocity onto the surface to be coated.

Another object of the invention is to provide improved impeller mechanism which is adapted to receive the coating material and propel the same in a continuous stream at high velocity against a support, such as a pipe to be coated.

A further object of the invention is the provision of apparatus for the continuous preparation and application of plastic coating material onto a support to be coated, and which embodies means for recovering excess coating material which falls from the support or otherwise escapes from the coating zone.

A still further object of the invention is the provision of apparatus for the continuous mixing and application of a plastic coating, which apparatus is of simple design and rugged construction, capable of long continued operation under the extreme conditions of hard usage to which such apparatus is likely to be subjected.

The above and other objects and advantages of the invention will best be understood from the following detailed description, constituting a specification of the same, when taken in conjunction with the annexed drawings wherein—

Figure 1 is a top plan view of the invention, partly broken away and partly in cross-section;

Figure 2 is a side-elevational view of the invention;

Figure 3 is a fragmentary top-plan view showing the return mechanism for excess coating material, separated from the remaining portions of the apparatus;

Figure 4 is a fragmentary top-plan view, partly broken away and partly in cross-section, showing the improved impeller mechanism separated from the remaining portions of the apparatus;

Figure 5 is a side-elevational view of the impeller mechanism of Figure 4, partly broken away and partly in cross-section taken along line 5—5 of Figure 4;

Figure 6 is an end elevational view of the impeller mechanism of Figures 4 and 5;

Figure 10 is a fragmentary top plan view, partly in cross-section showing a modified form of impeller mechanism separated from the remaining portions of the apparatus;

Figure 11 is a cross sectional view taken along the line 11—11 of Figure 10; and Figure 12 is a side elevational view showing in detail the driving means of the impeller mechanism of Figures 10 and 11.

Figure 7:
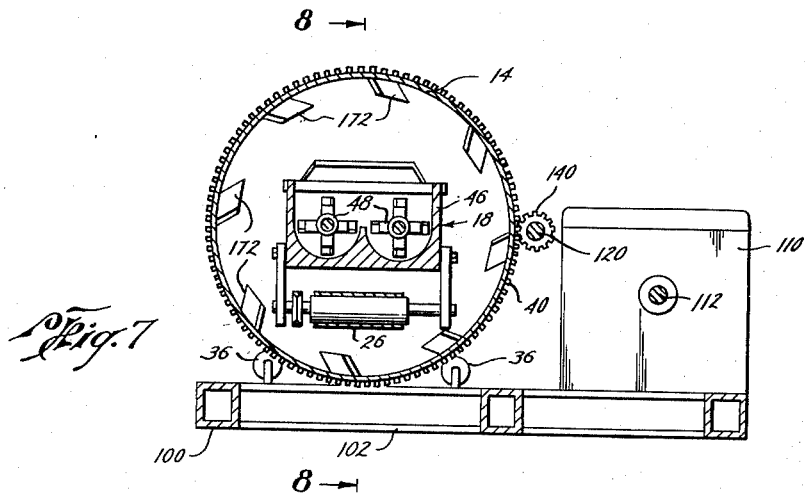
Figure 7 is a cross-sectional view taken along the line 7—7 of Figure 2.

Referring now to the drawings in greater detail, wherein like numerals of reference designate the same parts throughout the several views, the numeral 10 indicates a receiver in the form of a hopper which is adapted to receive the dry ingredients of the coating material, and which is mounted on the outer end of a conveyer tube 12 whose inner end extends into a rotatable mixing drum 14, and in which a feed screw 16 operates to feed the dry ingredients from the hopper to the drum. The dry ingredients are thoroughly mixed in the mixing drum 14, and the mixture passes out of the drum into a feeding and mixing apparatus, generally indicated at 18 wherein the mixture is further mixed and moisture is added to the mix through the piping system, generally indicated by 20. From the mixing and feeding conveyor mechanism, the moistened mix passes to impeller mechanism, including a belt-like impeller 22, by which the coating material is propelled onto a support which is to be coated, such as a pipe K.

Excess coating material which falls from the pipe K, or otherwise escapes from the coating zone is collected in return mechanism, including a hopper 24 from which the material is returned to the mixing drum 14 by means of a belt conveyor 26 or the like.

The mixing drum 14 is supported on spaced rollers 36, suitably attached to the frame of the apparatus, and supportingly engaging exterior tracks 38 on the drum, and the drum has an external ring gear 40 therearound by which the drum is rotated by means later to be described. Within the drum are inwardly extending vanes 42 arranged to mix the dry ingredients upon rotation of the drum and to feed the same into the inner end of the feeding and mixing apparatus inside the drum.

The mixing and feeding conveyor extends into the discharge end of the drum and includes a trough-like casing 46 within which are located feeding and mixing devices 48. At its inner end the casing 46 extends into the discharge end of the drum 14 and is provided therein with adjustable closure mechanism indicated generally at 49 in dotted lines in Figure 2, whereby the amount of material fed from the drum to the mixing and feeding conveyor may be regulated. At its outer end the casing 46 opens downwardly to discharge the coating material onto the belt 22 of the impeller mechanism. At the top of the casing 46 there is located a water pipe 54, provided with suitable means, such as perforations or nozzles through which water may be distributed to the mixed coating ingredients as they pass through the mixing and feeding conveyor mechanism. Suitable piping, provided with any convenient type of control valve means, leads from the water pipe 54 to a pump, connected to a source of water, such as a reservoir 64.

The impeller by which the coating is propelled against the supporting surface is illustrated in detail in Figures 4, 5 and 6, and takes the form of an endless belt 22 which passes about supporting rollers 28 and 30, carried by shafts 32 and 34, respectively, which are rotatably supported by spaced bearings, such as those indicated at 39 and 41, respectively, mounted on horizontal members 43 and 45 suitably attached to the upper ends of vertical supports 47 attached to the frame of the apparatus. The shaft 34 is extended at one end and carries a pulley 48 fixed thereon, over which a driving belt 50, or the like operates, which driving belt is driven by suitable means, such as an electric motor 52, through the intermediation of a pulley 54 carried by the motor shaft.

Adjacent its outer end the trough 46 of the mixing and feeding mechanism has a downwardly directed discharge opening 56 above the impeller belt 22, whereby coating material is discharged onto the belt to be propelled toward the support to be coated. By operation of the motor 52 the belt 22 may thus be moved at relatively high velocity in a direction to propel the coating material against the pipe K.

Above the belt 22 a stationary hood 58 is suitably supported, having downwardly extending sides 60 and 62, which confine to the belt the coating material discharged through the opening 56. The hood or cover 58 is spaced somewhat above the belt, and is open at its inner end, to provide a discharge passageway or throat 66 between the belt and the hood, through which the coating material passes. The belt is preferably provided with laterally extending flights 68, which may conveniently be in the form of angles, suitably attached at spaced intervals to the outer surface of the belt. The flights 68 project outwardly from the belt to the same distance, and are adapted to receive the coating material between them to propel the same toward the object to be coated. At its outer end the hood or cover 58 is provided with a downwardly extending skirt 70 extending across the belt above the flights 68 to level off the coating material between the flights, thus assuring a uniform flow of coating material from the impeller mechanism. It will be evident that under some conditions of operation the flights 68 of the impeller belt may be dispensed with, and the coating operation satisfactorily accomplished by the use of a plain belt, or that the belt may have a roughened surface or be provided with other means for gripping and propelling the coating material.

The hopper 24 of the return means for excess coating material may have downwardly and inwardly converging sides, providing an open bottom 53 through which the collected material is deposited on the conveyor belt 26. This belt 26 passes about a roller 74, supported from the bottom of the return hopper, and a similar roller 76 suitably supported within the discharge end of the mixing drum 14.

Suitable mechanism, such as wheeled carriages indicated generally at 80 and 82, may be provided for moving the pipe K, or other object to be coated, past the impeller mechanism. The carriages 80 and 82 are conveniently adapted to move along a track having spaced rails 84 and 86, and each of the carriages is provided with suitable means, such as sets of supporting wheels or rollers 88 and 90, upon which the pipe K is rotatably supported. Suitable means, such as an electric motor, may be provided on one of the carriages, which means is drivingly connected with the pipe supporting rollers, whereby the pipe may be rotated at the same time that it is being moved longitudinally past the impeller mechanism.

The entire coating mechanism may be mounted on a base, as best seen in Figures 1 and 2 of the drawing, which base conveniently takes the form of a frame having longitudinal side members 100, connected at the ends by end members 102, and having cross-ties 104, located at suitable intervals intermediate the ends of the frame. Upright supports 106, attached to the base, support the feeding mechanism by which the dry ingredients are introduced to the mixing drum, and additional upright supports 108, secured to the base intermediate its ends, support the mixing and feeding mechanism 18 thereon.

A suitable source of power, such as an internal combustion engine, indicated at 110 is carried by the frame, which engine has a driving shaft 112, connected in driving relation to an electrical generator 114, and also to a driving shaft 116, through the intermediation of a suitable driving belt 118. The countershaft 116 is connected in driving relation, through suitable gearing and a second countershaft 119 to a driving shaft 120. A clutch 122, carried by the countershaft 116 is also operable to connect this shaft in driving relation to a gear 124, which meshes with a gear 126 fixed on a driving shaft 128, which in turn is drivingly connected with the mixing and feeding devices 48, through the intermediation of a sprocket chain 130. The shafts 132 and 134, of the mixing and feeding devices 48 are suitably mounted for rotation in the trough 46, and carry at their outer ends intermeshing gears 136 and 138, whereby the mixing and feeding devices are adapted for simultaneous operation.

The driving shaft 120 has a gear 140, which meshes with the external ring gear 40 on the mixing drum 14, whereby the drum is rotated by rotation of the shaft 120. The shaft 120 also carries a sprocket 142, which is connected in driving relation with a shaft 144, by means of a sprocket 146 and driving chain 148, said shaft 144 having suitable driving connection with the feed screw 16, whereby the dry ingredients are conveyed from the hopper 10 to the mixing drum 14.

The pump P is suitably connected in driving relation with a motor, such as the electric motor 150, for pumping water from the reservoir 64 to the distributor pipe 54 to add moisture in regulated quantities to the mixed ingredients in the mixing and feeding mechanism.

Suitable electrical control mechanism, not shown, is provided for controlling the operation of the impeller mechanism, the pump P, and the mechanism by which the pipe K is rotated and moved past the impeller mechanism.

In the operation of the coating machine the dry ingredients are loaded into the hopper 10, from whence they are fed by way of the conveyor tube 12 into the mixing drum 14. After being thoroughly mixed in the mixing drum, the dry ingredients are fed into the inner end of the mixing and feeding mechanism 18, in which the ingredients are further mixed, and moisture is added thereto in controlled quantities through the water distributing pipe 54. The coating material thus formed is discharged through the opening 56 onto the endless impeller belt 22, which is moving at a relatively high velocity. The coating material falls between the flights 68 on the impeller belt and passes through the discharge passageway or throat 66, and is projected at high velocity against the pipe K, which is being moved past the impeller mechanism and rotated at uniform speed. As the coating material passes through the throat or passage 66 the skirt 70 at the outer end of the hood or cover 58 causes the coating material to be evenly distributed between the flights 68 so that the coating material is projected from the impeller mechanism in a constant uniform stream, to provide a uniform coating on the pipe.

Figure 8:
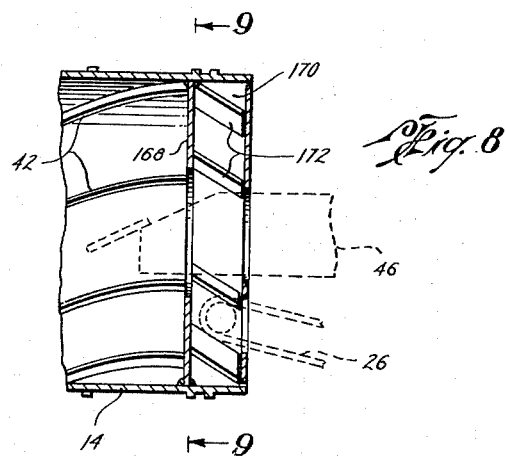
Figure 8 is a cross-sectional view taken along the line 8—8 of Figure 7, looking in the direction indicated by the arrows.
Figure 9:
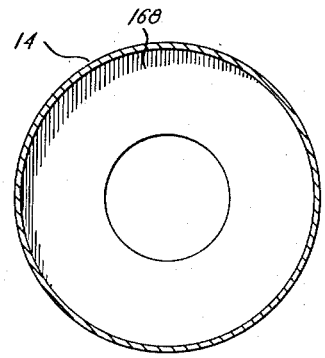
Figure 9 is a cross-sectional view taken along the line 9—9 of Figure 8, looking in the direction indicated by the arrows.

Any excess coating material which falls from the pipe, or otherwise escapes from the coating zone is collected in the hopper 24, and falls on the endless return belt 26, by which it is returned to the mixing drum 14. Within the mixing drum there is a vertical annular plate 168, as best seen in Figures 8 and 9, dividing the mixing drum, and forming a compartment 170 therein, into which the recovered coating material is deposited separately from the dry ingredients in the drum. Suitable vanes 172 are disposed within the compartment 170, which serve to raise the recovered coating material as the drum rotates, and deposit the same within the inner end of the trough 46 of the mixing and feeding mechanism, whereby the recovered coating material is added to the dry mix, to be further mixed and moistened therewith to form further coating material. In this manner wastage of coating material is substantially eliminated, and uniform consistency of the coating material which is fed through the impeller mechanism is assured at all times during the operation of the machine.

It will be apparent that by suitably arranging and proportioning the vanes 42 in the drum 14 and by suitable adjustment of the closure mechanism 49 of the mixing and feeding conveyor, the amount of coating material which is fed to the impeller mechanism can be regulated within very narrow limits and maintained substantially constant during the entire coating operation.

The countershaft 116 also carries a sprocket 152 which is connected in driving relation to a sprocket 154 by means of a drive chain 156. The sprocket 154 is carried on the end of a shaft 158, of a right-angle drive 160, which is suitably connected in driving relation to the shaft 76 of the roller 74 of the return belt 26, through a drive chain 164, or other suitable means.

In Figures 10, 11 and 12 there is illustrated a modified form of impeller mechanism wherein the same impeller belt 22 is employed with the same coating material supplying apparatus and return mechanism as previously described hereinabove.

In this form of the invention, the impeller belt 22 may be employed alone, without any material confining means such as the hood or cover 58. Improved results have been obtained, however, by the use of a rotatable impeller member in conjunction with the belt 22, such as a brush or roller 174. The rotatable member 174 is preferably mounted on a suitably supported shaft 176 above the shaft 34 of the belt driving mechanism. The periphery of the rotatable member 174 is preferably spaced above the belt a distance to provide a discharge passageway or throat 66' between the belt and the rotatable member to permit the passage of the coating material through the impeller mechanism and to be directed onto the pipe K.

The rotatable member 174 may be in the form of an idler brush or roller or may be driven. For the purpose of driving the rotatable member, the shaft 176 is extended at one end and has a pulley 178 fixed thereon, over which a belt 50' operates. The belt 50' is driven by the pulley 54 attached to the shaft of a motor as in the previously described form of the impeller mechanism. The belt 50' also passes about the pulley 48 on the shaft 34 by which the belt 22 is driven, and about an idler pulley 180 suitably supported to maintain the belt 50' under proper tension.

In the operation of a modified form of the impeller mechanism the coating material is fed onto the belt 22 from the discharge opening 56 of the mixing and feeding apparatus and is carried by the belt between the flight 68 thereon past the rotatable member 174, whereby the material is directed onto the pipe K.

It will be apparent that by the provision of the rotatable member 174 the coating material is confined and directed onto the pipe in a limited zone and prevented from being scattered as it leaves the impeller, thus effectively preventing waste of the coating material. By driving the rotatable member so that its periphery travels at the same linear speed as the belt 22 it will also be seen that the rotatable member offers no resistance to the flow of coating material and that a minimum of wear on said member will result from the operation of the impeller.

It will readily be apparent that the feed of the impeller mechanism may be accurately controlled throughout a wide range, and that the amount of coating material as well as the velocity with which it is projected against the supporting surface, may be accurately regulated to conform to any conditions of operation or variations in the nature of the coating material or the support which is to be coated.

It will thus be seen that the invention as described above provides coating applying mechanism which is capable of use for a variety of different operations and which may be continuously operated to apply large quantities of coating material in a uniform manner and with a minimum expenditure of time and labor.

Having thus clearly shown and described the invention, what is claimed as new and desired to secure by Letters Patent is:

1. In apparatus for the continuous preparation and application of plastic coating material, an endless belt, a rotatable member supported in spaced relation to said belt and having a material-engaging peripheral portion forming with said belt a discharge passageway, a rotatable drum, conveyor means having an inlet in said drum and an outlet leading to said belt, means in the drum for mixing dry coating ingredients and introducing the same into said inlet, means for introducing moisture into said ingredients in said conveyor means, means in said conveyor means for agitating said ingredients during moistening of the same to form a plastic coating material and for discharging said material through said outlet, means for driving said belt to propel said material from said outlet through said passageway, a return conveyor extending into said drum, a receiver positioned to receive material from said passageway and to discharge said material on said return conveyor, means in said drum separating said material in the drum from said dry ingredients, means in said drum for introducing said material into said inlet, and means for simultaneously actuating said drum and said mixing and discharging means.

2. In apparatus for the continuous preparation and application of plastic coating material, an endless belt, a rotatable member supported in spaced relation to said belt and having a material-engaging peripheral portion forming with said belt a discharge passageway, a rotatable drum, conveyor means having an inlet in said drum and an outlet leading to said belt, means in the drum for mixing dry coating ingredients and introducing the same into said inlet, means for introducing moisture into said ingredients in said conveyor means, means in said conveyor means for agitating said ingredients during moistening of the same to form a plastic coating material and for discharging said material through said outlet, means for simultaneously driving said belt and said rotatable member to propel said material from said outlet through said passageway, a return conveyor extending into said drum, a receiver positioned to receive material from said passageway and to discharge said material on said return conveyor, means in said drum separating said material in the drum from said dry ingredients, means in said drum for introducing said material into said inlet, and means for simultaneously actuating said drum and said mixing and discharging means.

CARL K. SMITH.

References Cited in the file of this patent

UNITED STATES PATENTS

| Number | Name | Date |
|---|---|---|
| 732,290 | Luhr et al. | Mar. 24, 1903 |
| 1,065,365 | Higgins | June 24, 1913 |
| 1,859,304 | Lipsius | May 24, 1932 |
| 1,954,005 | Westberg et al. | Apr. 10, 1934 |
| 2,009,652 | Conwill | July 30, 1935 |
| 2,099,346 | Perkins | Nov. 16, 1937 |
| 2,262,647 | Perkins | Nov. 11, 1941 |
| 2,264,048 | McMahon et al. | Nov. 25, 1941 |
| 2,352,749 | Wills | July 4, 1944 |
| 2,420,217 | Allen | May 6, 1947 |
| 2,489,846 | Ammerall | Nov. 29, 1949 |
| 2,565,696 | Moller et al. | Aug. 28, 1951 |